United States Patent
Rubitschung

(10) Patent No.: US 12,466,655 B2
(45) Date of Patent: Nov. 11, 2025

(54) HOLDER ASSEMBLY FOR TRANSFER DEVICE

(71) Applicant: RUBITEC AG, Bennwil (CH)

(72) Inventor: Christoph Rubitschung, Lampenberg (CH)

(73) Assignee: RUBITEC AG, Bennwil (CH)

( * ) Notice: Subject to any disclaimer, the term of this patent is extended or adjusted under 35 U.S.C. 154(b) by 0 days.

(21) Appl. No.: 18/811,596

(22) Filed: Aug. 21, 2024

(65) Prior Publication Data

US 2025/0066127 A1    Feb. 27, 2025

(30) Foreign Application Priority Data

Aug. 22, 2023    (CH) ............................. 000885/2023

(51) Int. Cl.
*B65G 3/04* (2006.01)
*B65B 39/00* (2006.01)
*B65B 55/00* (2006.01)

(52) U.S. Cl.
CPC .............. *B65G 3/04* (2013.01); *B65B 39/007* (2013.01); *B65B 55/00* (2013.01)

(58) Field of Classification Search
CPC . B65B 31/024; B65B 69/0075; B65B 39/007; B65G 69/183
See application file for complete search history.

(56) References Cited

U.S. PATENT DOCUMENTS

| 4,344,468 A * | 8/1982 | Sandberg ................ B65B 39/04 141/69 |
| 11,932,439 B2 * | 3/2024 | Rubitschung ........ B65G 69/183 |
| 2010/0132215 A1 * | 6/2010 | Denk ................... B65G 69/183 34/389 |

FOREIGN PATENT DOCUMENTS

| EP | 3718911 A1 | 10/2020 |
| EP | 3725694 A1 | 10/2020 |
| EP | 4046926 A1 | 8/2022 |

* cited by examiner

*Primary Examiner* — Timothy P. Kelly
(74) *Attorney, Agent, or Firm* — Procopio, Cory, Hargreaves & Savitch, LLP

(57) ABSTRACT

A holder assembly comprises first and second tubular elements adjoined to each other, separated by an annular gap, and jointly surrounding an interior. A first clamping element extends radially outwardly around the first tubular element. A film tube can be guided out of the interior through the annular gap onto an outer side of the first tubular element, and be fixed in a sealing manner along a first circumferential line of the film tube by the first clamping element against a first contact pressure surface of the first tubular element. The film tube can be fixed in a sealing manner along a second circumferential line of the film tube in the annular gap. A gas outlet opens out of the outer surface of the first tubular element between the annular gap and the contact pressure surface, and in direct fluid-dynamic connection with an outer edge of the annular gap.

11 Claims, 6 Drawing Sheets

HOLDER ASSEMBLY FOR TRANSFER DEVICE

CROSS-REFERENCE TO RELATED APPLICATIONS

This application claims the priority to CH 000885/2023, filed Aug. 22, 2023, the contents of which are incorporated herein by reference.

The present invention relates to a holder assembly for holding a film tube, in particular a holder assembly for a transfer device, in particular for a transfer device for the low-contamination transfer of process material.

In the technical field of low-contamination transfer of process material, it is known to achieve a separation between a contaminated inside of the transfer device or the inside of the container and an environment to be protected from contamination with the process material by means of a tubular film, a so-called liner, when docking a container to a transfer device or when undocking the container from a transfer device. Similarly, a process material located on the inside can be protected from contamination with a substance from the environment.

A device and a method for a contamination-protected transfer of process material between a first and a second container is known from the publication EP 3718911 A1. In this method, tubular usable sections of the liner are clamped and released along circumferential lines of the liner by a plurality of clamping elements, which can be actuated independently of each other. The clamping and opening of the clamping elements and the insertion of the liner sections into these clamping elements are carried out in such a way and in such a sequence that an essentially tight separation between the inside and the surrounding area is maintained continuously throughout transfer processes and replacement processes of tubular films. When handling the tubular film, there are always situations in which it is not possible to completely rule out the escape of very fine dust from the process material, for example. Improvements in the direction of further minimizing contamination are desirable.

It was the object of the present invention to provide a device which further increases safety with regard to accidental contamination when transferring process material.

This object is solved in a surprisingly simple way by a holder assembly according to an exemplary aspect. Embodiments of the holder assembly result from the features of the exemplary aspects.

The holder assembly according to the invention is suitable for holding a film tube in a sealed manner. The holder assembly comprises a first tubular element, to which a second tubular element adjoins, separated from the first tubular element by an annular gap. The first and second tubular elements together surround an interior space. A first clamping element extends radially outwards around the first tubular element. The first tubular element, the second tubular element and the first clamping element are designed in such a way that the film tube can be guided from the interior through the annular gap onto an outer side of the first tubular element, that the film tube can be fixed in a sealing manner along a first circumferential line of the film tube by the first clamping element against a first contact pressure surface of the first tubular element and that the film tube can be fixed in a sealing manner along a second circumferential line of the film tube in the annular gap. A gas outlet opens out of the outer surface of the first tubular element in an area between the annular gap and the contact pressure surface. The gas outlet is in direct fluid-dynamic connection with an outer edge of the annular gap.

The inventor has recognized that, as mentioned above, the situation can arise during transfer operations that a section of the film tube has to be pulled out of the annular gap when the clamping element is clamped. A high contact pressure on the film tube leads on the one hand to a good seal along the gap, but hinders the removal of the film tube from the gap and in extreme cases can also lead to the film tube being damaged during removal. A low contact pressure makes it easier to pull out, but can lead to sealing problems. The holder assembly according to the invention solves this dilemma. The gas outlet makes it possible to build up a pressure difference between the gas outlet and the interior. By applying a pressure difference between the gas outlet and the interior, a gas flow is created through the gap into the interior, in each case at those points where the seal between layers of the film tube or between the film tube and the first or second tubular element is not perfect. The inward gas flow blows dust particles from the process material inwards, for example, and prevents them from accidentally escaping into the environment.

The holder assembly is also applicable to a more difficult situation in which two or three layers of liner come to lie in the annular gap of the holder assembly, for example an inverted liner section lying in two layers in the gap, as will be discussed in more detail below in the context of embodiments of the holder assembly and in the context of process sequences in which the holder assembly is used.

The annular gap can, for example, have the shape of a circular ring. The first and second tubular elements can, for example, have the shape of hollow cylinders with a circular cross-section in a section adjoining the annular gap, wherein the hollow cylinders are arranged coaxially to one another and wherein the first and second tubular elements each adjoin the annular gap with an end face of the hollow cylindrical section. The annular gap can, for example, also have the shape of a polygon with rounded corners, e.g. the shape of a square or a rectangle with rounded corners. The ends of the two tubular elements that meet at the annular gap then naturally have the corresponding shape, resulting in a circumferential gap.

In one embodiment of the holder assembly, the gas outlet is fluid-dynamically connected to a means for generating a gas volume flow, in particular to a pressure cylinder or to a pump.

In one embodiment of the holder assembly, the second tubular element can be moved relative to the first tubular element in an axial direction for opening and closing the annular gap.

The gap can be closed, for example, until a section of the film tube located in the annular gap is pressed against it. The second tubular element can, for example, be resiliently mounted so that the contact pressure between the tubular elements can be easily controlled. The first and/or the second tubular element can, for example, comprise a sealing ring which adjoins the annular gap between the first and second tubular element.

In one embodiment, the holder assembly comprises a second clamping element, wherein the second clamping element extends around the first tubular element and is arranged such that, in an activated state of the second clamping element, a folded-in section of the film tube can be fixed in a sealing manner against a second contact pressure surface of the first tubular element and that, at least in a non-activated state of the second clamping element, the direct fluid-dynamic connection between the gas outlet and the outer edge of the annular gap is open.

The second clamping element can be in the form of an inflatable seal, for example. Such an inflatable seal can be activated and deactivated from the outside, i.e. without contact with the process material to be transferred, for example by forcing compressed air into the inflatable seal or releasing it from the inflatable seal.

The problem is further solved by a transfer device according to an exemplary aspect. One embodiment of the transfer device is shown by the features of an exemplary aspect.

The transfer device according to the invention is used to transfer process material, in particular flowable process material. The transfer device comprises a holder assembly according to the invention. The transfer device can, for example, comprise connection means for the sealed connection of a container from which the process material to be transferred is to be removed. Alternatively, the transfer device can also be part of a production plant in which the process material to be transferred is manufactured or processed. The transfer device can comprise further elements which are used, for example, to clean the transfer device.

One embodiment of the transfer device further comprises a transfer unit which enables engagement with the interior and which enables the ejection of contaminated residues from sections of the film tube.

The invention further relates to a method according to an exemplary aspect.

The method according to the invention comprises holding a film tube contaminated on one side in the gap of a holder assembly according to the invention and, during this holding, generating a gas pressure at the gas outlet which is increased compared to the interior.

This method leads to increased safety against accidental leakage of particles of the process material while the film tube is held in the annular gap. Under certain circumstances, the film tube can be positioned in the gap in sections with a single layer and in sections with multiple layers. The point with the most layers and the contact pressure used determine the distance between the first and second tubular element. Sections with only one layer of tubular film do not provide an optimum seal. Sections with lower tightness and sections with higher tightness can occur along the circumference of the gap. Due to the increased gas pressure on the outside compared to the inside, a flow from the outside to the inside is created at the points with lower tightness and prevents particles from escaping.

The invention further relates to a method according to an exemplary aspect.

The method is used to replace a film tube that is held in one embodiment of the holder assembly and contaminated on one side with a new, uncontaminated film tube. This method relates to an embodiment of the holder assembly with a first and a second clamping element. The method comprises the following steps of:

sealed fixing of a folded-over, annular region of the film tube contaminated on one side in the second clamping element, wherein the film tube forms a bag shape and is closed at one end with a crimp or tie;

inserting a first end of the uncontaminated film tube from the interior through the gap into the opened first clamping element and closing of the first clamping element for sealingly fixing the uncontaminated film tube along a first circumferential line of the film tube against a first contact pressure surface of the first tubular element;

moving the second tubular element up to a clamping position against the first tubular element, wherein two layers of the contaminated film tube and one layer of the uncontaminated film tube are held in the gap;

releasing the second clamping element and pulling out the contaminated film tube in the direction of the interior, while an increased gas pressure is generated at the gas outlet compared to the interior.

This creates a gas flow from the outside to the inside during the critical phases of pulling the film tube out of the gap, where there is always an imperfect seal between the outside and inside. This gas flow drives particles of the process material from the outside to the inside and prevents them from accidentally escaping into the environment. This makes it possible to reduce the contact pressure between the first and second tubular elements during the phase of pulling the film tube out of the gap compared to the contact pressure used to hold the film tube in the gap.

The two methods mentioned above can easily be combined, wherein long sequences of alternating holding and replacement of the film tube can be realized.

The invention is further directed to a method according to an exemplary aspect. This is a method for transferring process material, which comprises, alternatively or in combination, the steps of the above-mentioned methods. Process material is transferred from a first container through the interior into a second container while the film tube is held sealed in the gap.

The increased gas pressure is applied during transfer and/or during replacement of the film tube between transfer operations. As discussed above, the risk of accidental leakage of process material is reduced in both phases.

The invention relates still further to a use according to an exemplary aspect, which relates to the use of the holder assembly according to the invention for holding a film tube during low-contamination transfer of process material.

Exemplary embodiments of the present invention are explained in more detail below with reference to figures, wherein.

Figure 3:
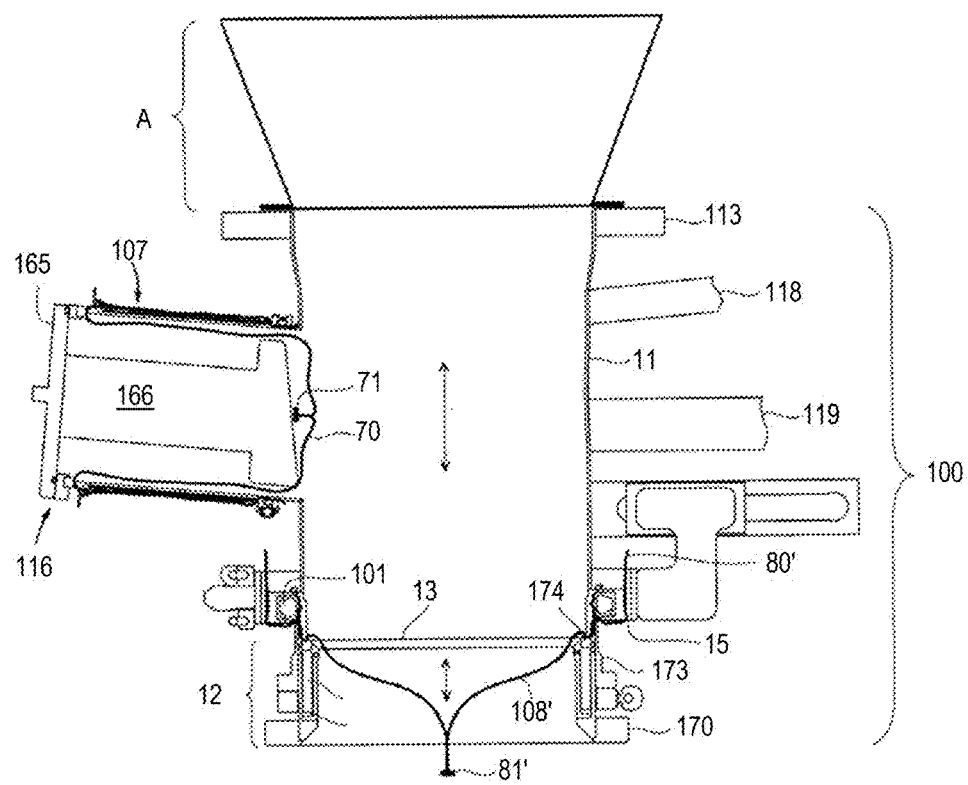
Figure 3:
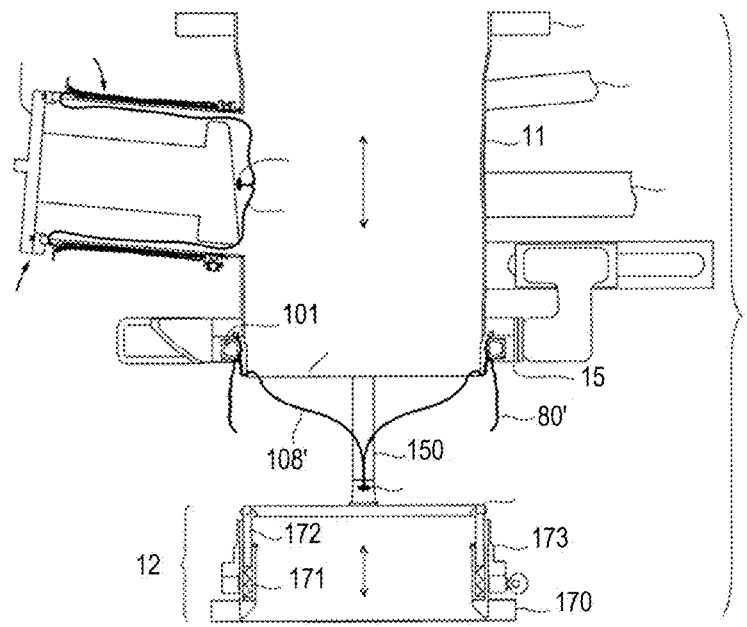
Figure 3:
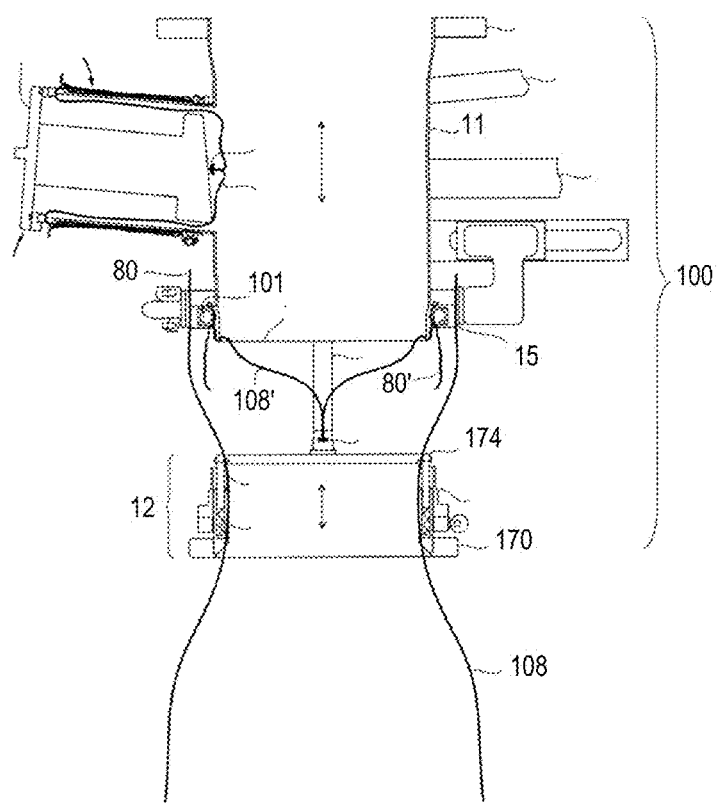
Figure 3:
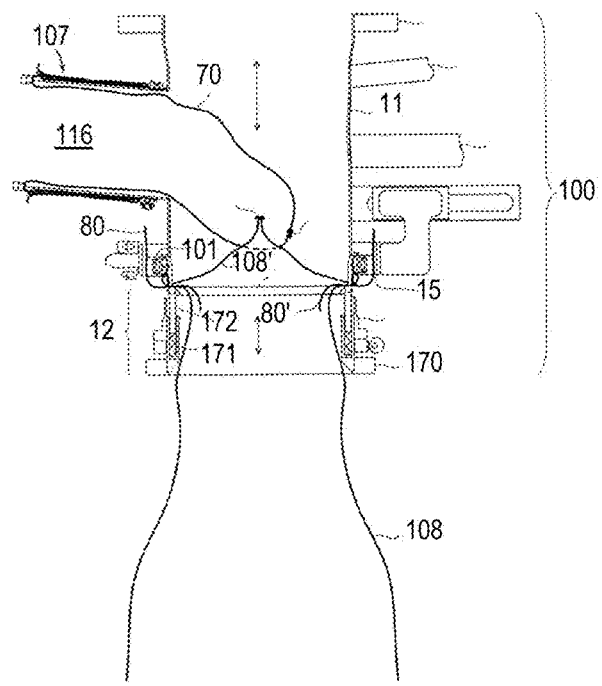
Figure 3:
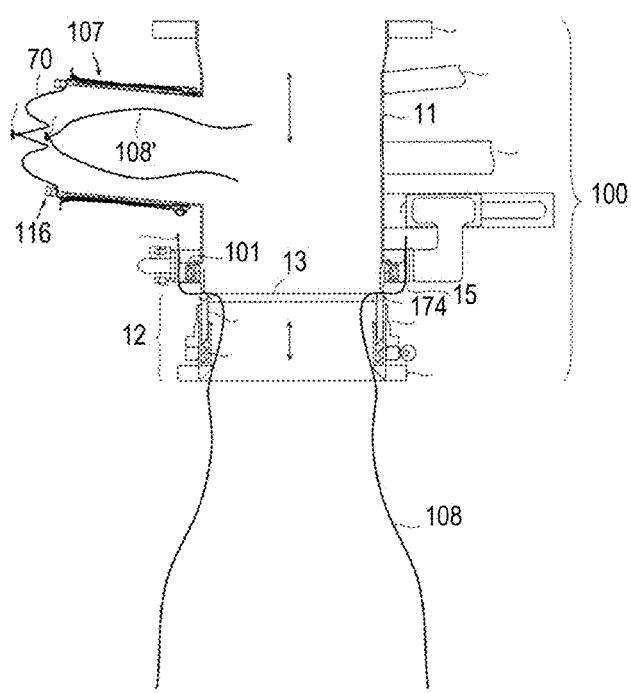
Figure 4:
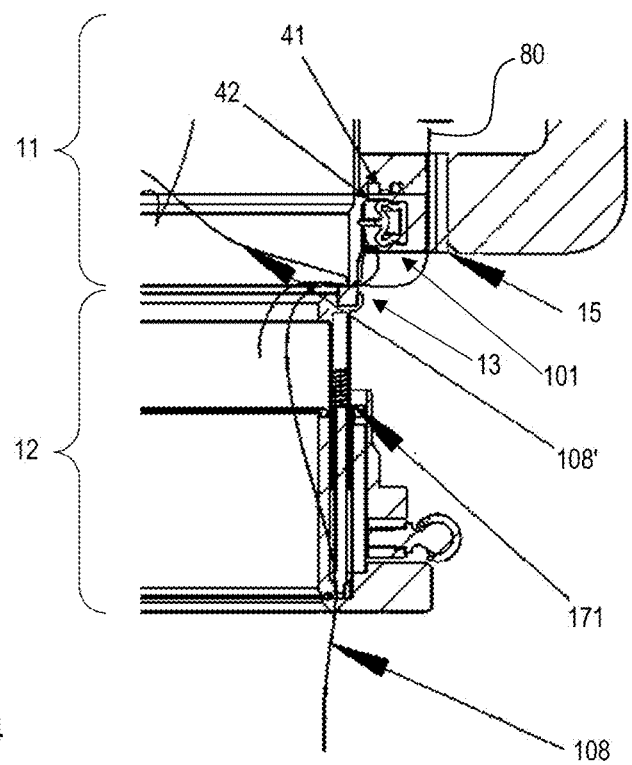
Figure 5:
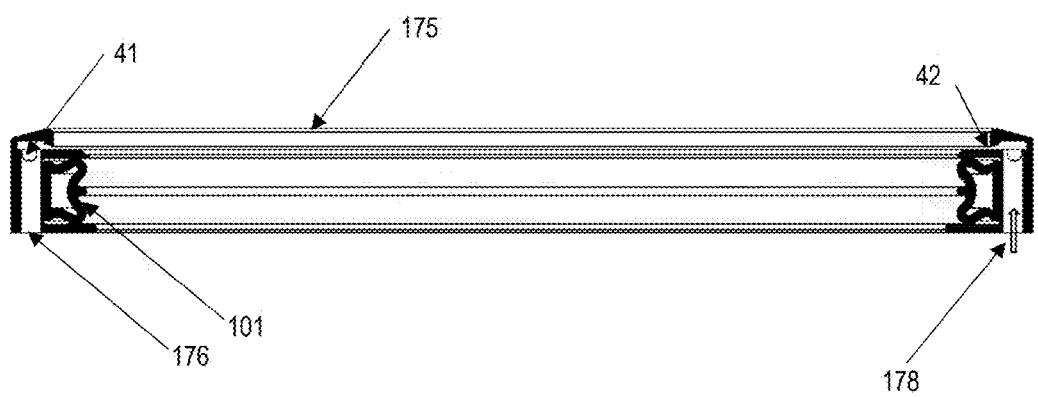
Figure 6:
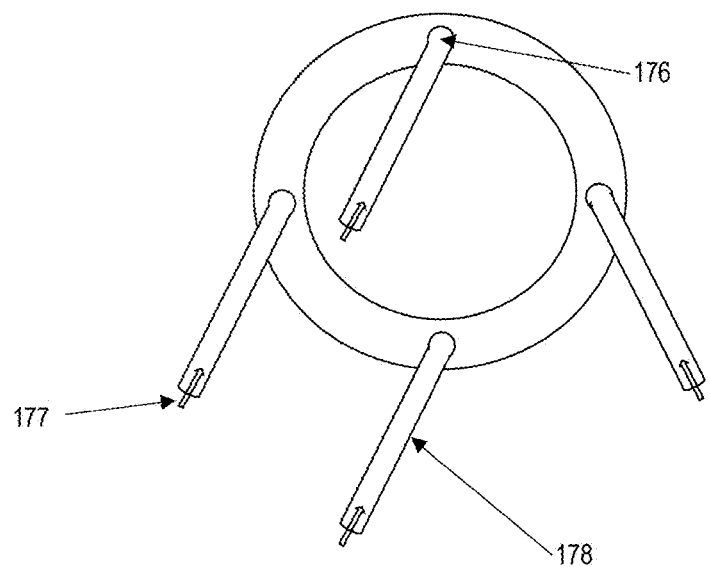

FIGS. 3.*a*) to 3.*e*) illustrate partials views of an embodiment of the transfer device in different phases of a variant of the method, as a schematic cross-sectional drawing;

FIG. 4 shows a detail from the transfer device in the phase according to FIG. 3.*d*);

FIG. 5 shows an exemplary embodiment of the second clamping element as a cross-sectional drawing; and FIG. 6 shows a lower view of the clamping element of FIG. 5.

Figure 1:
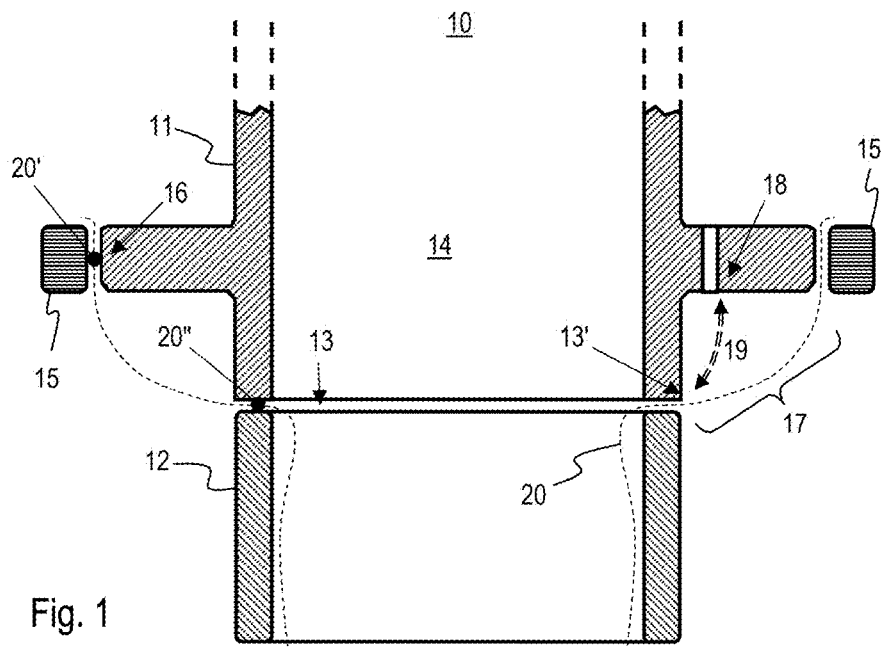
FIG. 1 shows a schematic sectional view of a holder assembly.

FIG. 1 shows a schematic sectional view of a holder assembly according to the invention. The holder assembly 10 comprises a first tubular element 11, which is adjoined by a second tubular element 12 separated from the first tubular element by an annular gap 13. The first tubular element 11 and the second tubular element 12 surround an interior 14. A first clamping element 15 extends radially outwards around the first tubular element. An empty space area surrounding the first tubular element adjoins the first tubular element. This spatial area is unobstructed and permits a fluid-dynamic connection between an edge 13' of the gap 13 and the gas outlet 18, which opens into a region 17. The fluid-dynamic connection is symbolized by a double arrow with a dashed double line. This is a direct fluid-dynamic connection, i.e. the gas that emerges from the gas outlet 18 can flow to the edge 13 of the gap 13'.

The first tubular element, the second tubular element and the first clamping element are designed in such a way that a film tube 20 can be held in the position shown in the dashed line in the manner shown. For this purpose, the film tube can be guided from the interior through the annular gap onto an outer side of the first tubular element, the film tube can be fixed in a sealing manner along a first circumferential line 20' of the film tube by the first clamping element and the film tube can be fixed in a sealing manner along a second circumferential line 20" of the film tube in the annular gap. In this sectional drawing, the two circumferential lines appear as dots.

Figure 2:
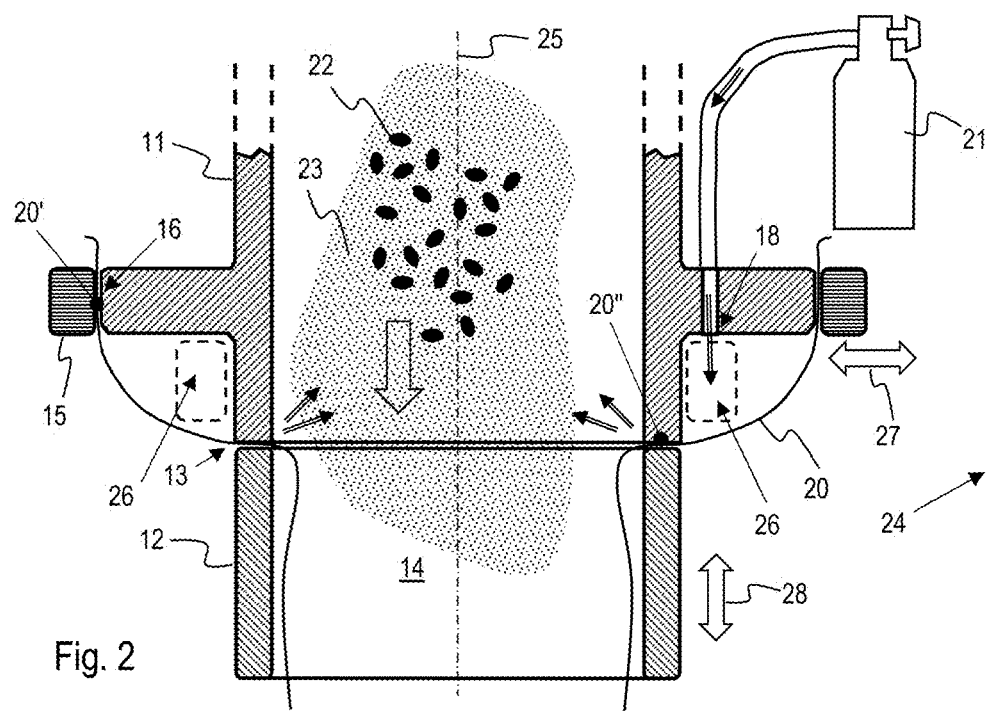
FIG. 2 shows the holder assembly from FIG. 1 in a concrete situation in use.

FIG. 2 shows the holder assembly from FIG. 1 in a specific application. Process material 22, here in the form of pellets, is transferred from top to bottom in the direction of the arrow. The resulting fine dust 23 should not escape into the environment 24. A film tube 20 is held tightly in the gap 13 and by the first clamping element 15. In the direction of movement 27 of the first clamping element 15, symbolized by a horizontal double arrow, the film tube is pressed against the first contact pressure surface 16 of the first tubular element. In the axial direction of movement 28 of the second tubular element, the second tubular element is moved towards the first tubular element until the gap 13 is largely closed. In the embodiment shown, the first and second tubular elements are rotationally symmetrical with respect to the common axis 25. The spatial area 26 is now separated from the surroundings 24 of the holder assembly by the film tube 20.

Means 21 for generating an increased gas pressure in the said spatial area 26 compared to the interior are realized here, for example, by a compressed gas cylinder. Gas flows from the pressurized gas cylinder through the gas outlet 18 into the spatial area 26, which extends in a ring around the first tubular element. Where a small gap opens along the gap 13, gas flows directly from the outside to the inside due to the excess pressure compared to the interior 14, as symbolized by the arrows with the double line. This greatly reduces the leakage of even the finest particles of the process material into the environment, even in the event of an imperfectly sealed gap between the film tube 20 and the first tubular element. As indicated by the dashed lines, the first tubular element can extend further upwards and be, for example, an element of a more complex transfer device.

In one exemplary embodiment, the interior can have a gas outlet to the environment provided with a filter. In this exemplary embodiment, a pressure difference between the pressure at the gas inlet and the interior can be easily maintained even if gas continuously flows through the gap 13 from the outside to the inside.

With reference to FIGS. 3.a) to 3.e), the following is a detailed description of an exemplary embodiment of the design of an embodiment of the transfer device according to the invention and its use in the context of a variant of the method according to the invention for transferring a process material in combination with a variant of the method for replacing the contaminated film tube with a new film tube following transfer. The following definition applies to the entire further description. If reference signs are included in a figure for the purpose of graphic clarity, but are not explained in the directly associated description text, reference is made to their mention in preceding figure descriptions. In the interest of clarity, the repeated designation of components in the following figures can sometimes be dispensed with, provided that it is clearly recognizable from the drawings that these are "recurring" components.

FIG. 3.a): First Phase Device Structure-Completion of a Transfer Process

The exemplary embodiment shown here assumes that a process material, in the form of flowable solids, is introduced from the first container A into a second container B in a contamination-protected manner by means of the transfer device 100. The first container A is directly connected in a sealed manner to a connection means 113 of the first tubular element 11 of the transfer device 100. The first tubular element has the function of a guide tube. The first container A is, for example, a container or a component of a production plant. The second receptacle B has the shape of a big bag or a container, for example, which contains a piece of liner 108" as a bag-shaped inner liner, the free end 80" of which is usually provided with a closure 89 before the start of a transfer process. The conveying direction could alternatively extend from the second container B to the first container A. The axial passage extending through the guide tube 11 (possible conveying directions in the axial passage are shown as double arrows) allows the process material to flow through. At the outlet end, the first tubular element 11 ends with a tube edge. An inert gas line 118 leads to the first tubular element 11 in the form of a guide tube, for feeding with inert gas if required by the special process material, as well as a detergent line 119 for cleaning the device 100.

In the embodiment shown, a transfer unit 116 opens into the first tubular element 11, which allows engagement in the tubular element and on which a plurality of removable usable sections 70, each provided with a first crimp 71, are stored by a tubular liner supply 107. Until it is used, the current usable section 70 lies in the transfer unit 116 and with its first crimp 71 towards the mouth and is advanced towards the mouth by a plug 166, which can be inserted into the transfer unit 116 from the outside. The plug 166 can be pulled out of the transfer unit 116 and is connected to an insertable cover 165. The transfer unit 116 is designed in the form of a side spigot extending from the first tubular element 11 and opens into the wall of the first tubular element 11 at an incline with a through opening. According to the embodiment shown, a liner remnant 108' from a previous transfer process is held in a sealing manner in this state in three areas, namely in the annular gap 13 between the first tubular element 11 and second tubular element 12, in the first clamping element 15 and in the second clamping element 101. The first and second clamping elements extend in an annular manner around the first tubular element. They are each intersected at two points in the cross-sectional drawing FIG. 3.a).

The second clamping element 101, here in the form of a currently activated inflatable seal, fixes the folded-in remaining end 80' of the liner remnant 108' in a sealed manner. The remaining end 80' extends from the second clamping element 101 to the first clamping element 15 and is also currently clamped there in a tightly sealed manner. The first clamping element is designed, for example, as a clamp which is narrowed in the closed state and widened in the open state and which has a manually operable closure.

The liner remnant 108' passes under the tube edge of the first tubular element 11, passes through the annular gap 13 and, provided at the bottom with the closing second crimp 81', hangs bag-shaped into the axial passage of the second tubular element 12, which has the function of a pressing unit. A base part 170 of the pressing unit is firmly connected to a lifting rod 150 (see FIG. 3.b), on which a pressing part 172 is elastically supported by means of an adjustable spring 171. The second tubular element 12 also has an activatable stopper element 173, which serves to fold the free end 80 of a new liner piece 108 into the second clamping element 101. In the current phase, the stopper element 173 is in the retracted position, i.e. it does not act into the second clamping element. If, as shown here, the base part 170 is moved as close as possible to the first tubular element 11, the liner remnant 108' is pressed by the seal 174 arranged on the pressing part 172 against the tubular edge of the first tubular element to form a tight seal. The suspension 171 is compressed and so the compressive force exerted via the lifting rod also acts on the seal 174.

FIG. 3.*b*): Second Phase

The second clamping element 101 remains activated and the second tubular element (i.e. the pressing unit) has moved away from the first tubular element 11 (i.e. from the guide tube). In the process, the suspension 171 has relaxed to the maximum, so the press ring 172 pushes out of the base part 170. The first clamping element 15 is now released. This allows the remaining end 80' of the liner remnant 108', which was previously clamped there, to be pulled out and now hangs down freely.

FIG. 3.*c*): Third Phase

With the second clamping element 101 still activated and with the second tubular element in the same spaced position, a new piece of liner 108 has been inserted through the second tubular element 12 (i.e. through the contact pressure unit) into the first clamping element 15, which was previously still open. The first clamping element 15 was then closed. In the state shown, the new liner piece is held in a sealing manner in the closed first clamping element.

FIG. 3.*d*): Fourth Phase

The remaining end 80' and the new liner piece 108 are guided around the edge of the tube. The base part 170 of the second tubular element has been moved up to a clamping position on the first tubular element 11, so the seal 174 arranged on the pressing part 172 now presses the remaining end 80' and the new liner piece 108 only moderately against the edge of the tube due to the force of the suspension 171. The second clamping element 101 can now be released, while the first clamping element 15 remains firmly closed. The cover 165 together with the stopper 166 are removed from the transfer unit 116. The liner remnant 108' is gripped by means of the current usable section 70 advanced from the liner supply 107 into the guide tube, i.e. into the first tubular element 11.

FIG. 3.*e*): Fifth Phase

While maintaining the position of the second tubular element 12, which has the function of a contact pressure unit, the gripped liner remnant 108' together with the second crimp 81' is pulled out of the released second clamping element 101 and out of the clamping point, which is formed by the annular gap 13, by means of the usable section 70 with still only moderate contact pressure of the seal 174 on the clamping point against the tube edge and is pulled into the transfer unit 116. The usable section 70 with the first crimp 71 on it thus begins to come out of the transfer unit 116. The first clamping element 15 remains closed, so that the clamped end 80 of the new liner piece 108 remains firmly sealed and is not pulled out at all.

Subsequently, the method steps can be carried out as described in the publication EP 3718911 A1 as the sixth to tenth phase, wherein a new transfer process as described above begins with the tenth phase.

FIG. 4 shows a sectional drawing of a detail from FIG. 3.*d*), in which more details in the area of the annular gap and the two clamping elements can be seen. The first clamping element 15 is closed in the state shown and holds an upper end 80 of the new liner section 108 in a sealing manner. The second clamping element 101, which is designed as an inflatable seal in the embodiment shown, is now relieved. A gas, for example air or an inert gas, flows into the annular channel 41. Through the small air gap 42, the inflowing gas flows past the relieved inflatable seal into the area of the outer surface of the first tubular element, which is directly adjacent to the annular gap, i.e. into the area between the annular gap and the first contact pressure surface against which the first clamping element presses the liner section 108. If the inward pulling of the liner section 108' results in an imperfectly sealed area along the circumference of the annular gap, gas flows inwards through this area due to the excess pressure on the outside and prevents process material from escaping. The spring pressure on the clamped liner can thus be reduced so that mechanical damage to the liner is less likely without the risk of dust escaping as a side effect. For example, the gas is allowed to flow in until the inflatable seal is inflated again (as shown in FIG. 3.*a*) and a further barrier against the escape of process material is created. In this embodiment, the gas outlet, which is important for the invention, opens into the annular channel 41, which forms an outer surface of the first tubular element. The gas outlet is not visible in the section shown in FIG. 4. Since the annular channel extends around the entire circumference of the first tubular element, the gas outlet therefore opens out of the outer surface of the first tubular element from an area between the annular gap and the aforementioned contact pressure surface. The gas outlet is in direct fluid-dynamic connection with the outer edge of the annular gap via the annular channel 41.

FIG. 5 shows an exemplary design of the second clamping element 101, which is designed as an inflatable seal. Annular channel 41 is designed as a groove extending around the first tubular element 11. A gas, for example air or an inert gas, flows into the annular channel through at least one access channel 176, preferably 6 to 8 access channels (arrow 177). A hose, for example, can be connected to the access channel 176, which supplies the gas (see FIG. 6). A guide lip 175 forms an air gap 42 between the annular channel 41 and the inflatable seal. The number and arrangement of the access channels 176 can be selected in such a way that the pressure distribution of the gas in the annular channel is as homogeneous as possible. In particular, a homogeneous pressure distribution can be ensured by the number and arrangement of the access channels if the gas escapes unevenly via the air gap, e.g. past the inflatable seal. The guide lip can be made of plastic and/or be removably attached to the second clamping element. The function of the gas to prevent dust from escaping is described above for FIG. 4.

FIG. 6 shows a bottom view of the second clamping element 101 from FIG. 5. In this example, hoses or pipes 178 are attached to the access channels 176, via which the gas (arrow 177), for example air or an inert gas, flows into the access channels. Four access channels are shown, wherein this number is only exemplary and at least one access channel but preferably 6 to 8 access channels can be provided.

LIST OF REFERENCE SIGNS

10 Holder assembly
11 First tubular element
12 Second tubular element
13 Annular gap
13' Outer edge (of the annular gap)
14 Interior
15 First clamping element 16 First contact pressure surface
17 Area of the outer surface of the first tubular element (between annular gap and first contact pressure surface)
18 Gas outlet
19 Direct fluid-dynamic connection
20 Film tube
20' First circumferential line (of the film tube)
20" Second circumferential line (of the film tube)
21 Means for generating a gas volume flow
22 Process material
23 Dust from process material
24 Environment
25 Axis
26 Spatial area circulating around the first tubular element
27 Direction of movement of the first clamping element
28 Direction of movement of the second tubular element
41 Annular channel
42 Small air gap
70 Usable section (of the liner supply)
71 Crimp or tie
80 Free end (of the liner piece)
80', 80" Remaining end
81, 81' Crimp or tie
89 Closure
100 Transfer device
101 Second clamping element
107 Liner supply
108 Liner piece
108' Liner remnant
108" Liner as bag-shaped packaging
113 Connecting means of the guide tube
116 Transfer unit
118 Inert gas line
119 Detergent line
150 Lifting rod
165 Cover
166 Plug
170 Base part (of the second tubular element)
171 Suspension
172 Press ring
173 Plug element
174 Seal
175 Guide lip
176 Access channel
177 Gas flow
178 Hose or tube
A First container
B Second container

The invention claimed is:

1. Holder assembly (10) for holding a film tube (20) in a sealed manner, wherein
the holder assembly comprises a first tubular element (11) which is adjoined by a second tubular element (12) separated from the first tubular element by an annular gap (13),
wherein the first and second tubular elements jointly surround an interior (14),
wherein a first clamping element (15) extends radially outwards around the first tubular element,
wherein the first tubular element, the second tubular element and the first clamping element are configured such that the film tube can be guided out of the interior through the annular gap onto an outer side of the first tubular element, that the film tube can be fixed in a sealing manner along a first circumferential line (20') of the film tube by the first clamping element against a first contact pressure surface of the first tubular element, and that the film tube can be fixed in a sealing manner along a second circumferential line (20") of the film tube in the annular gap,
wherein a gas outlet (18) opens out of the outer surface of the first tubular element in an area (17) between the annular gap and the contact pressure surface, and wherein the gas outlet is in direct fluid-dynamic connection (19) with an outer edge (13') of the annular gap.

2. Holder assembly (10) according to claim 1, wherein the gas outlet (18) is fluid-dynamically connected to a means (21) for generating a gas volume flow.

3. Holder assembly (10) according to claim 2, wherein the means (21) for generating the gas volume flow comprises a pressure cylinder or a pump.

4. Holder assembly (10) according to claim 1, wherein the second tubular element (12) is movable relatively to the first tubular element (11) in an axial direction for opening and closing the annular gap.

5. Holder assembly (10) according to claim 1, wherein the holder assembly comprises a second clamping element (101), wherein the second clamping element extends around the first tubular element and is arranged such that, in an activated state of the second clamping element, a folded-in section of the film tube can be fixed in a sealing manner against a second contact pressure surface of the first tubular element and that, at least in a non-activated state of the second clamping element, the direct fluid-dynamic connection (19) between gas outlet (18) and the outer edge (13') of the annular gap is open.

6. Transfer device (100) for transferring process material (22), wherein the transferring device comprises the holder assembly (10) according to claim 1.

7. Transfer device (100) according to claim 6, further comprising a transfer unit (116) which enables intervention in the interior and enables ejection of contaminated residues from sections of the film tube.

8. Method comprising holding a film tube (20, 108') contaminated on one side in the gap (13) of a holder assembly (10) according to claim 1 and, during this holding, generating a gas pressure at the gas outlet (18) which is increased compared to the interior (14).

9. Method for replacing a film tube (108') held in a holder assembly (10) according to claim 4 and contaminated on one side, with a new, uncontaminated film tube (108), wherein the method comprises the steps of:
sealed fixing of a folded-over, annular region of the film tube (108') contaminated on one side in the second clamping element (101), wherein the film tube (108') forms a bag shape and is closed at one end with a crimp or tie (81');
inserting a first end of the uncontaminated film tube (108) from the interior (14) through the gap (13) into the opened first clamping element (15) and closing of the first clamping element for sealingly fixing the uncontaminated film tube (108) along a first circumferential line (20') of the film tube (108) against a first contact pressure surface (16) of the first tubular element (11);
moving the second tubular element (12) up to a clamping position against the first tubular element (11), wherein two layers of the contaminated tubular film (108') and one layer of the uncontaminated tubular film (108) are held in the gap (13);
releasing the second clamping element and pulling out the contaminated film tube (108') in the direction of the interior (14), while an increased gas pressure is generated at the gas outlet (18) compared to the interior (14).

10. Method for transferring process material comprising the steps according to claim 9, wherein process material is transferred from a first container through the interior (14) into a second container while the film tube (108) is held sealed in the gap (13).

11. Method for transferring process material comprising the steps according to claim 8, wherein process material is transferred from a first container through the interior (14) into a second container while the film tube (108) is held sealed in the gap (13).

\* \* \* \* \*